(12) United States Patent
Schoeley et al.

(10) Patent No.: US 7,820,770 B2
(45) Date of Patent: Oct. 26, 2010

(54) CROSSLINKABLE COMPOSITIONS BASED ON ORGANOSILICON COMPOUNDS

(75) Inventors: Peter Schoeley, Diera-Zehren (DE); Herbert Soellradl, Emmerting (DE)

(73) Assignee: Wacker Chemie AG, Munich (DE)

( * ) Notice: Subject to any disclaimer, the term of this patent is extended or adjusted under 35 U.S.C. 154(b) by 360 days.

(21) Appl. No.: 11/222,261

(22) Filed: Sep. 8, 2005

(65) Prior Publication Data

US 2006/0063895 A1    Mar. 23, 2006

(30) Foreign Application Priority Data

Sep. 23, 2004   (DE) .................. 10 2004 046 179

(51) Int. Cl.
   *C08L 83/04*   (2006.01)
   *B32B 9/04*    (2006.01)
(52) U.S. Cl. .................. 525/474; 528/34; 428/447
(58) Field of Classification Search .......... 528/34
   See application file for complete search history.

(56) References Cited

U.S. PATENT DOCUMENTS

| | | | | |
|---|---|---|---|---|
| 3,532,731 A | * | 10/1970 | Hittmair et al. | 556/453 |
| 3,542,901 A | | 11/1970 | Cooper et al. | |
| 3,689,454 A | * | 9/1972 | Smith et al. | 528/17 |
| 3,714,089 A | | 1/1973 | Hamilton et al. | |
| 3,873,334 A | * | 3/1975 | Lee et al. | 106/287.12 |
| 3,914,199 A | * | 10/1975 | Lee et al. | 524/361 |
| 3,960,802 A | * | 6/1976 | Beers et al. | 524/857 |
| 4,143,088 A | * | 3/1979 | Favre et al. | 525/477 |
| 4,247,445 A | * | 1/1981 | Smith et al. | 524/425 |
| 4,369,289 A | * | 1/1983 | Keogh | 525/105 |
| 4,985,476 A | * | 1/1991 | Endres et al. | 523/210 |
| 5,011,900 A | * | 4/1991 | Yukimoto et al. | 525/477 |
| 5,223,595 A | * | 6/1993 | Stepp et al. | 528/14 |
| 5,238,967 A | * | 8/1993 | Okawa et al. | 521/77 |
| 5,268,441 A | * | 12/1993 | Barthel et al. | 528/17 |
| 5,432,218 A | * | 7/1995 | Mikami et al. | 524/262 |
| 5,486,589 A | | 1/1996 | Inoue et al. | |
| 5,486,635 A | * | 1/1996 | Okawa | 556/437 |
| 5,625,022 A | * | 4/1997 | Onishi | 528/15 |
| 5,633,302 A | * | 5/1997 | Adachi et al. | 524/262 |
| 5,665,805 A | * | 9/1997 | Hatanaka et al. | 524/322 |
| 5,705,587 A | * | 1/1998 | Hatanaka et al. | 528/17 |
| 5,741,839 A | * | 4/1998 | Scheim | 524/188 |
| 5,780,543 A | * | 7/1998 | Adachi et al. | 524/789 |
| 6,001,948 A | * | 12/1999 | Scheim et al. | 528/34 |
| 6,090,902 A | * | 7/2000 | Kuo et al. | 526/279 |
| 6,218,499 B1 | * | 4/2001 | Tarumi et al. | 528/42 |
| 6,235,832 B1 | | 5/2001 | Deng et al. | |
| 6,410,640 B1 | * | 6/2002 | Fukunaga et al. | 524/588 |
| 6,542,901 B1 | | 4/2003 | Devine et al. | |
| 2004/0254275 A1 | * | 12/2004 | Fukui et al. | 524/261 |
| 2006/0058483 A1 | * | 3/2006 | Zha et al. | 528/14 |

FOREIGN PATENT DOCUMENTS

| | | | |
|---|---|---|---|
| EP | 0553842 A | | 8/1993 |
| EP | 0641829 A | | 3/1995 |
| EP | 1008613 A2 | * | 6/2000 |
| JP | 05209074 A | | 8/1993 |
| JP | 07233327 A | | 9/1995 |
| JP | 09-151326 | | 6/1997 |
| JP | 10298432 A | * | 11/1998 |
| JP | 2004-182942 | | 7/2004 |
| JP | 2005-162974 | | 6/2005 |
| JP | 2005162974 A | * | 6/2005 |
| JP | 2005187600 A | * | 7/2005 |

OTHER PUBLICATIONS

Wypych (Handbook of Plasticers, William Andrew Publishing, Toronto, 2004, cover page, publication data page and pp. 7-71).*
Certified English-language translation of JP-2004182942. Translation provided on Oct. 2008 by FLS, Inc.*
English Abstract corresponding to JP 2004-182942, 2004.
English Abstract corresponding to JP 09-151326, 1997.
English Abstract corresponding to JP 2005-162974, 2005.

\* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

Crosslinkable organosilicon compositions with controllable modulus can be prepared using organosilicon compounds composed of units of the formula $$(HO)_a R_b SiO_{(4-a-b)/2} \quad \quad (I),$$

where
R is identical or different and is a monovalent, optionally substituted hydrocarbon radical optionally interrupted by heteroatoms,
a is 0 or 1, and
b is 0, 1, 2 or 3,
with the proviso that the organosilicon compound has a single unit of the formula (I) where a=1, and has a viscosity of from 5 to 1000 mPas at 25° C.

24 Claims, No Drawings

CROSSLINKABLE COMPOSITIONS BASED ON ORGANOSILICON COMPOUNDS

BACKGROUND OF THE INVENTION

1. Field of the Invention

The invention relates to crosslinkable compositions having controllable modulus, and based on organosilicon compounds, to a process for their preparation, and also to their use.

2. Background Art

There are a wide variety of known crosslinkable compositions based on organosilicon compounds. Single-component sealing compounds which can be stored if water is excluded, but on ingress of water vulcanize at room temperature to give elastomers, are likewise known. Large amounts of these products are used, for example, in the construction industry. Such sealing compositions are based on linear polymers terminated by silyl groups bearing reactive substituents such as OH groups, or hydrolyzable groups, e.g. acetoxy groups. These mixtures also usually comprise fillers, non-reactive plasticizers, and, if appropriate, crosslinking agents, catalysts, and additives. For many applications it is desirable that the modulus of a hardened test specimen of the sealing compound, i.e. the tensile stress value at 100% tensile strain, is low. This minimizes the tensile stress on the side of the joint when a joint is subjected to tensile strain, thus avoiding any breaking away of the sealing compound from the substrate. The large chain lengths specifically required for low-modulus sealing compounds lead to very high viscosities of the polymers, the result being difficulty in handling of the sealing compounds in the non-crosslinked state. For example, the materials are difficult to extrude from packs, or exhibit an undesirable extent of stringiness during use.

It has also been known for a long time that the modulus can be varied by varying the amount of non-reactive plasticizers and of active fillers. However, there are limits to which variation of these components can be made; not every desired variation is possible. If, for example, the amount of plasticizer is excessive, or the amount of active filler is inadequate, the viscosity of the composition becomes too low, impairing the application performance of the paste-like sealing compound. Use of high-viscosity polymers which to some extent contain an unreactive group at a chain end is also known. By way of example, U.S. Pat. No. 6,235,832 describes polymers which are obtained via reaction of vinyl-terminated polydimethylsiloxanes with Si—H-containing crosslinking agents. However, there is then the risk that unreactive, high-viscosity constituents will exude from the hardened sealing compound, which can lead to soiling of the subtrates. U.S. Pat. No. 3,542,901 describes the use of a preferably high-viscosity linear polysiloxane in an alcohol-eliminating RTV1 system which has random distribution of reactive and unreactive end groups, the permissible total amount of unreactive chain ends present being only at most 40%. However, this leads to products with undesirably high vulcanisate haidnesses.

SUMMARY OF THE INVENTION

The invention provides crosslinkable compositions based on organosilicon compounds, which can be prepared from organosilicon compounds composed of units of the formula $$(HO)_a R_b SiO_{(4-a-b)/2} \quad (I)$$

where

R may be identical or different and is a monovalent, optionally substituted hydrocarbon radical which may be interrupted via heteroatoms, a is 0 or 1, and b is 0, 1, 2 or 3, with the proviso that the organosilicon compound has a single unit of the formula (I) where a=1, and has a viscosity of from 5 to 1000 mPas at 25° C.

DETAILED DESCRIPTION OF THE PREFERRED EMBODIMENT(S)

The inventively used organosilicon compounds composed of units of the formula (I) are preferably substantially linear diorganosiloxanes of the formula $$OH(R_2SiO)_n SiR_3 \quad (II)$$

where R is as defined above, and the average value for n has been selected in such a way that the compound of formula (II) has a viscosity of from 5 to 1000 mPas, measured at 25° C. Although this is not stated in formula (II) or literally discernible from the term diorganopolysiloxane, it is possible, as a consequence of the preparation process, for up to 10 mol percent, preferably up to 1 mol percent, of the diorganosiloxane units to have been replaced by other siloxane units, such as $R_3SiO_{1/2}$, $RSiO_{3/2}$, and $SiO_{4/2}$ units, where R is as defined above, but this is not preferred. For the purposes of the present invention, the term organopolysiloxanes includes not only polymeric and oligomeric but also dimeric siloxanes.

The radical R is preferably a monovalent hydrocarbon radical having from 1 to 18 carbon atoms, optionally substituted by halogen atoms, by amino groups, by ether groups, by ester groups, by epoxy groups, by mercapto groups, by cyano groups, or by (poly)glycol radicals, the latter being composed of oxyethylene units and/or of oxypropylene units, and most preferably is a hydrocarbon radical having from 1 to 12 carbon atoms, in particular the methyl radical.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and 2-propenyl radicals; aryl radicals such as the phenyl, naphthyl, anthryl, and phenanthryl radicals; alkaryl radicals such as o-, m-, p-tolyl radicals, xylyl radicals, and ethylphenyl radicals; and aralkyl radicals such as the benzyl radical, and the α- and the β-phenylethyl radicals.

Examples of substituted radicals R are the 3-aminopropyl, 3-(2-aminoethyl)aminopropyl, 3-cyclohexylaminopropyl, N-cyclohexylaminomethyl, 3-glycidoxypropyl, and 3-methacryloxypropyl radicals.

Examples of organosilicon compounds composed of units of the formula (I) are $(Me_3SiO)_3Si$—OH, $HO(SiMe_2O)_{65}SiMe_3$, $HO(SiViMeO)_{90}SiMe_3$, and $HO(SiMe_2O)_{40}SiViMe_2$, where Me is a methyl radical and Vi is a vinyl radical.

The organosilicon compounds composed of units of the formula (I) are in particular α-hydroxy-ω-trialkylsilylpolydialkylsiloxanes with a viscosity of from 5 to 1000 mPas at 25° C., most preferably α-hydroxy-ω-trimethylsilylpolydimethylsiloxanes having a viscosity of from 5 to 1000 mPas at 25° C. The organosilicon compounds preferably have a viscosity of from 10 to 500 mm²/s, more preferably from 20 to 200 mm²/s, at 25° C. These organosilicon compounds may be prepared by familiar chemical methods, e.g. via reaction of trimethylsilanol with hexamethylcyclotrisiloxane in the presence of potassium fluoride.

The inventive compositions preferably comprise amounts of from 0.1 to 15 parts by weight, more preferably from 0.1 to 10 parts by weight, and in particular from 0.5 to 5 parts by weight of organosilicon compounds composed of units of the formula (I), in each case based on 100 parts by weight of crosslinkable composition.

The inventive compositions can be any desired known types of compositions based on organosilicon compounds and crosslinkable to give elastomers, examples being single-component or two-component room-temperature-vulcanizable organopolysiloxane compositions (known as RTV compositions). These crosslinkable compositions may be free from fillers, but may also comprise active or inactive fillers.

The nature and amount of the components conventionally used in compositions of this type are known to one skilled in the art.

The inventive organosilicon compounds composed of units of the formula (I) may be mixed as desired with the other components of the crosslinkable compositions. For example, they can be incorporated by mixing as a final step into the otherwise finished silicone rubber formulation, or can be incorporated during the preparation of the silicone rubber mixture. However, the organosilicon compounds composed of units of the formula (I) may also be premixed into one or more of the components used.

The mixing process for preparing the compositions is preferably simple mechanical mixing. Depending on the consistency and viscosity of the parent liquid, the mixing process may take place in kneaders, dissolvers, Z mixers, or simple stirrers. The mixing process is preferably carried out at reduced pressure. However, mixing at atmospheric pressure or increased pressure is also possible. For reasons of simplicity, preference is likewise given to conducting the mixing process at ambient temperature. However, it is also possible to mix at an elevated temperature or with cooling.

The inventive compositions are preferably compositions which can be crosslinked via a condensation reaction. Such compositions are preferably compositions prepared from
(A) organosilicon compounds having at least two hydroxy groups or having at least two hydrolyzable radicals,
(B) organosilicon compounds composed of units of the formula (I), and, if appropriate,
(C) crosslinking agent(s).

One type of each component or a plurality of each type of component may be used, as is also the case with optional components.

The organosilicon compounds (A) are preferably compounds of the general formula $$Y_{3-c}R^1_c SiO-[R^1_2 SiO]_d-SiR^1_c Y_{3-c} \quad (III)$$

where
c is 0, 1, or 2,
$R^1$ may be identical or different and is as defined for R,
Y may be identical or different and is a hydroxy group or a hydrolyzable radical, and d is a whole number from 200 to 10,000, preferably from 300 to 3000, and most preferably from 400 to 2000. Component (A) is different from those of formulae (I) and (II).

Examples of radicals $R^1$ are the examples stated above for radical R. The radical $R^1$ is preferably a monovalent hydrocarbon radical having from 1 to 18 carbon atoms, optionally substituted by halogen atoms, by amino groups, by ether groups, by ester groups, by epoxy groups, by mercapto groups, by cyano groups, or by (poly)glycol radicals, the latter being composed of oxyethylene units and/or of oxypropylene units, and is most preferably a hydrocarbon radical having from 1 to 12 carbon atoms, in particular the methyl radical.

Examples of radical Y are hydroxy radicals, and also any hydrolyzable radical, e.g. acetoxy radicals, oximato radicals and organyloxy groups such as alkoxy radicals, for example ethoxy radicals, alkoxyethoxy radicals, and methoxy radicals. The radical Y is preferably an acetoxy radical or hydroxy radical, most preferably, a hydroxy radical.

The selection of the average value for the number d in formula (III) is preferably such that the viscosity of the organopolysiloxane of formula (III) is from 1000 to 2,500,000 mPa·s, more preferably from 4000 to 800,000 mPa·s, in each case measured at a temperature of 25° C. Although it is not stated in formula (III), up to 10 mol percent of the diorganosiloxane units may be replaced by other siloxane units, such as $R^1_3SiO_{1/2}$, $R^1SiO_{3/2}$, and $SiO_{4/2}$ units, where $R^1$ is as defined above.

Examples of the organopolysiloxanes (A) used in the inventive compositions are
$(MeCOO)_2MeSiO[SiMe_2O]_{200-2000}SiMe[OOCMe]_2$,
$(OH)Me_2SiO[SiMe_2O]_{200-2000}SiMe_2(OH)$,
$(MeCOO)_2EtSiO[SiMe_2O]_{200-2000}SiEt(OOCMe)_2$ and
$(MeCOO)_2ViSiO[SiMe_2O]_{200-2000}SiVi(OOCMe)_2$, where
Me is a methyl radical, Et is an ethyl radical, and Vi is a vinyl radical.

The organosilicon compounds (A) used in the inventive compositions are commercially available products or can be prepared by processes known in silicon chemistry, for example via reaction of α,ω-dihydroxypolyorganosiloxanes with the corresponding organyloxysilanes.

For the crosslinking agents (C) it is possible to use any crosslinking agents which are useful in compositions crosslinkable via condensation, for example crosslinking agents having at least three hydrolyzable radicals, preferably selected from acetoxy, oximato, and organyloxy groups.

Examples of crosslinking agents (C) are organyloxysilanes, oximosilanes, and acetoxysilanes, and also their partial hydrolysates, e.g. methyltriacetoxysilane, ethyltriacetoxysilane, propyltriacetoxysilane, vinyltriacetoxysilane, tetraethoxysilane, tetraisopropoxysilane, tetra-n-propoxysilane, methyltrimethoxysilane, methyltriethoxysilane, vinyltrimethoxysilane, and vinyltriethoxysilane, and also their partial hydrolysates. The partial hydrolysates here can be partial homohydrolysates, i.e. partial hydrolysates of one type of organosilicon compound, or else partial cohydrolysates, i.e. partial hydrolysates of at least two different types of organosilicon compounds.

If the crosslinking agents (C) are partial hydrolysates of organosilicon compounds, preference is given to those having up to 6 silicon atoms. Preferred crosslinking agents (C) used are methyltriacetoxysilane, ethyltriacetoxysilane, propyltriacetoxysilane, and vinyltriacetoxysilane, and/or their partial hydrolysates. The amount of crosslinking agents (C), when used, is preferably from 0.05 to 10 parts by weight, more preferably from 0.2 to 5 parts by weight, based in each case on 100 parts by weight of constituent (A). The crosslinking agents (C) are commercially available products or can be prepared by processes known in silicon chemistry.

In addition to the components described above (A), (B), and optionally, (C), the inventive compositions may also comprise any other conventional substances used in compositions crosslinkable via condensation reaction, examples being catalysts (D), plasticizers (E), fillers (F), adhesion promoters (G), and additives (H).

Examples of optional catalysts (D) are titanium compounds and organotin compounds, e.g. di-n-butyltin dilaurate and di-n-butyltin diacetate, di-n-butyltin oxide, dioctyltin diacetate, dioctyltin dilaurate, dioctyltin oxide, and also reaction products of these compounds with alkoxysilanes such as tetraethoxysilane, preference being given to di-n-butyltin diacetate and dibutyltin oxide in tetraethyl silicate hydrolysate, and with particular preference being given to di-n-butyltin oxide in tetraethyl silicate hydrolysate. When catalysts (D) are used, the amounts are preferably from 0.01 to 3 parts by weight, preferably from 0.05 to 2 parts by weight, based in each case on 100 parts by weight of constituent (A).

Examples of plasticizers (E), are dimethylpolysiloxanes which are liquid at room temperature and are end-capped with trimethylsiloxy groups, in particular those with viscosities in the range from 50 to 1000 mPas at 25° C., and also high-boiling hydrocarbons, such as paraffin oils or mineral oils composed of naphthenic or paraffinic units. The preferred amounts of plasticizers are from 0 to 300 parts by weight, more preferably from 10 to 200 parts by weight, and in particular from 20 to 100 parts by weight, based in each case on 100 parts by weight of organopolysiloxane (A).

Examples of optional fillers (F) are non-reinforcing fillers, i.e. fillers whose BET surface area is up to 50 $m^2/g$, e.g. quartz, diatomaceous earth, calcium silicate, zirconium silicate, zeolites, metal oxide powders such as aluminum oxides, titanium oxides, iron oxides, zinc oxides, or their mixed oxides, barium sulfate, calcium carbonate, gypsum, silicon nitride, silicon carbide, boron nitride, glass powders, and plastic powders such as polyacrylonitrile powder; and reinforcing fillers, i.e. fillers whose BET surface area is more than 50 $m^2/g$, e.g. fumed silica, precipitated silica, precipitated chalk, carbon black such as furnace black and acetylene black, and silicon-aluminum mixed oxides of high BET surface area; fibrous fillers, such as asbestos, and also synthetic fibers. The fillers mentioned may have been hydrophobicized, for example via treatment with organosilanes or organosiloxanes, with stearic acid, or via etherification of hydroxy groups to give alkoxy groups. If fillers (F) are used, they are preferably hydrophilic fumed silica and precipitated or ground calcium carbonate. The preferred amounts of filler are from 0 to 300 parts by weight, more preferably from 1 to 200 parts by weight, and in particular from 5 to 200 parts by weight, based in each case on 100 parts by weight of organopolysiloxane (A).

Examples of adhesion promoters (G) are silanes and organopolysiloxanes having functional groups, e.g. those having glycidoxypropyl, aminopropyl, or methacryloxypropyl radicals, and also tetraalkoxysilanes. However, if another component, such as siloxane (A) or crosslinking agent (C), intrinsically has the functional groups mentioned, it is possible to omit addition of adhesion promoter. The preferred amounts of adhesion promoter are from 0 to 50 parts by weight, more preferably from 1 to 20 parts by weight, and in particular from 1 to 10 parts by weight, based in each case on 100 parts by weight of organopolysiloxane (A).

Examples of additives (H) are pigments, dyes, odorants, oxidation inhibitors; agents for influencing electrical properties, e.g. conductive carbon black; flame retardants; light stabilizers; agents to lengthen skinning time, e.g. silanes having an SiC-bonded mercaptoalkyl radical; cell-forming agents, e.g. azodicarbonamide; heat stabilizers; agents with thixotropic effect, for example phosphoric esters; and organic solvents. The preferred amounts of additives are from 0 to 100 parts by weight, more preferably from 0 to 30 parts by weight, and in particular from 0 to 10 parts by weight, based in each case on 100 parts by weight of organopolysiloxane (A).

The inventive compositions are most preferably compositions which can be prepared from
(A) organosilicon compounds of the formula (III),
(B) organosilicon compounds composed of units of the formula (I),
(C) optionally, a crosslinking agent,
(D) optionally, a catalyst,
(E) optionally, plasticizer,
(F) optionally, fillers,
(G) optionally, adhesion promoter(s), and
(H) optionally, further additives.

Most preferably, no components other than components (A), (B), (C), (D), (E), (F), (G), and (H) are used for preparation of the inventive compositions.

To prepare the inventive compositions, all of the constituents may be mixed with one another in any desired sequence, e.g. components (A) and (B) if appropriate with components (C), (D), (E), and (F). However, it is also possible, by way of example, to premix component (B) with (C), and then to continue by mixing this premix with the other components. Reactions known as end capping reactions can occur here if Si—OH groups are present. This mixing can take place at room temperature and at ambient atmospheric pressure, i.e. from about 900 to 1100 hPa. However, this mixing process can also take place at higher or lower temperatures, e.g. at temperatures in the range from 35° C. to 135° C. or at from 0 to 20° C., and also at higher or lower pressures. In-situ preparation of one or more of the components used is also possible.

Each of the individual constituents of the inventive compositions may be one type of that constituent or else a mixture composed of two or more different types of such constituents.

At room temperature and at ambient atmospheric pressure, the inventive compositions are preferably flowable or foam-consistency pastes.

The usual water content of air is sufficient to crosslink the inventive compositions, which preferably takes place at room temperature. Crosslinking can also, if desired, be carried out at temperatures higher or lower than room temperature, e.g. at from −5° to 15° C., or at from 30° to 50° C., and/or at water concentrations above the normal water content of air. The crosslinking preferably takes place at a pressure of from 100 to 1100 hPa, in particular at ambient atmospheric pressure.

The present invention further provides moldings produced via crosslinking of the inventive compositions.

The inventive compositions may be used for any applications for which it is possible to use compositions which can be stored when water is excluded, but which on ingress of water crosslink at room temperature to give elastomers.

The inventive compositions therefore have excellent suitability, by way of example, as sealants for joints, including joints which run vertically, and for similar spaces whose gap width is, for example, from 10 to 40 mm, e.g. in buildings, terrestrial vehicles, watercraft, and aircraft, or as adhesives or putty compositions, e.g. in window construction, for production of protective coverings, including those for surfaces continually exposed to freshwater or to seawater, coverings that reduce slip, elastomeric moldings, and for insulation of electrical or electronic apparatus.

Advantages of the inventive compositions include simple preparation from readily accessible starting materials, ease of application, very good storage stability, and high crosslinking rate. A particular advantage is that it is possible to provide sealing compounds with controllable modulus, the modulus being readily adjustable within wide limits by way of addition of the organosilicon compounds composed of units of the formula (I).

All of the viscosity data in the examples described below are based on a temperature of 25° C. Unless otherwise stated, the examples below are carried out at ambient atmospheric pressure, i.e. at about 1000 hPa, and at room temperature, i.e. at about 23° C., or at the temperature resulting from combination of the reactants at room temperature without additional heating or cooling, and at a relative humidity of about 50%. All data concerning parts and percentages are based on weight unless otherwise stated. The α-hydroxy-ω-trimethylsilylpolydimethylsiloxane used in the examples was prepared as in U.S. Pat. No. 5,223,595 via reaction of trimethylsilanol with hexamethylcyclotrisiloxane, with potassium fluoride as a catalyst.

EXAMPLE 1

1400 g of an α,ω-dihydroxypolydimethylsiloxane with viscosity of 80,000 mPa·s, 707 g of a trimethylsilyl-end-capped polydimethylsiloxane with viscosity of 100 mPa·s, and 17 g of an α-hydroxy-ω-trimethylsilylpolydimethylsiloxane of 100 mPa·s were mixed in a planetary gear mixer with 76 g of ethyltriacetoxysilane and 33 g of methyltriacetoxysilane for 5 minutes. 182 g of fumed silica with specific surface area of 150 m$^2$/g (commercially available from Wacker-Chemie GmbH, Munich, Germany, the trademark HDK® V15) were then incorporated. After 20 minutes of in-vacuo homogenization, 0.24 g of dibutyltin diacetate was incorporated by mixing in vacuo. The product prepared was drawn off into commercially available, moisture-proof PE cartridges.

After a storage time of 24 hours, the extrusion rate was determined at a pressure of 6.1 bar with a nozzle aperture of 2 mm. To determine Shore A hardness by the ISO 868 method, the composition was stored for 24 hours after draw-off and then allowed to crosslink to give 6 mm plaques. To determine tensile strain at break and modulus (tensile stress at 100% tensile strain), the composition was likewise stored for 24 hours after draw-off and then allowed to crosslink to give H test specimens to ISO 8339 (hardening: 4 weeks at 21° C. and 50% humidity). The results are presented in Table 1, as are the results obtained in the remaining examples.

EXAMPLE 2

The procedure described in example 1 was repeated, except that 28 g of α-hydroxy-ω-trimethylsilylpolydimethylsiloxane and 696 g of a trimethylsilyl-end-capped polydimethylsiloxane were used instead of 17 g of α-hydroxy-ω-trimethylsilylpolydimethylsiloxane and 706 g of a trimethylsilyl-end-capped polydimethylsiloxane.

EXAMPLE 3

The procedure described in example 1 was repeated, except that 39 g of α-hydroxy-ω-trimethylsilylpolydimethylsiloxane and 685 g of a trimethylsilyl-end-capped polydimethylsiloxane were used instead of 17 g of α-hydroxy-ω-trimethylsilylpolydimethylsiloxane and 706 g of a trimethylsilyl-end-capped polydimethylsiloxane.

EXAMPLE 4

The procedure described in example 1 was repeated, except that 51 g of α-hydroxy-ω-trimethylsilylpolydimethylsiloxane and 673 g of a trimethylsilyl-end-capped polydimethylsiloxane were used instead of 17 g of α-hydroxy-ω-trimethylsilylpolydimethylsiloxane and 706 g of a trimethylsilyl-end-capped polydimethylsiloxane.

EXAMPLE 5

The procedure described in example 1 was repeated, except that 62 g of α-hydroxy-ω-trimethylsilylpolydimethylsiloxane and 662 g of a trimethylsilyl-end-capped polydimethylsiloxane were used instead of 17 g of α-hydroxy-ω-trimethylsilylpolydimethylsiloxane and 706 g of a trimethylsilyl-end-capped polydimethylsiloxane.

EXAMPLE 6

17 g of an α-hydroxy-ω-trimethylsilylpolydimethylsiloxane with viscosity of 100 mPa·s were mixed in a laboratory dissolver with 26 g of ethyltriacetoxysilane and 13 g of methyltriacetoxysilane for 5 minutes, whereupon the end-capping reaction that takes place between the Si—OH groups and the crosslinking agent molecules liberates acetic acid (premix).

1400 g of an α,ω-dihydroxypolydimethylsiloxane with viscosity of 80,000 mPa·s, 707 g of a trimethylsilyl-end-capped polydimethylsiloxane (PDMS) with viscosity of 100 mPa·s, 50 g of ethyltriacetoxysilane, and 20 g of methyltriacetoxysilane are mixed in a planetary gear mixer for 5 minutes. The premix prepared above was then incorporated into these ingredients, and then 182 g of fumed silica with specific surface area of 150 m$^2$/g (commercially available from Wacker-Chemie GmbH, Munich, Germany under the trademark HDK® V15) were incorporated by mixing. After 20 minutes of in-vacuo homogenization, 0.24 g of dibutyltin diacetate was incorporated by mixing in vacuo. The product prepared was drawn off into commercially available moisture-proof PE cartridges and the procedure continued as described in example 1.

|  | Examples | | | | | |
| --- | --- | --- | --- | --- | --- | --- |
|  | 1 | 2 | 3 | 4 | 5 | 6 |
| Extrusion rate (g/min) | 322 | 342 | 355 | 355 | 355 | 312 |
| Hardness (Shore A) | 17 | 15 | 15 | 13 | 12 | 17 |
| Tensile strain at break (%) | 432 | 445 | 517 | 523 | 545 | 426 |
| Modulus (N/mm) | 0.35 | 0.33 | 0.29 | 0.28 | 0.27 | 0.35 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A single component RTV-1 crosslinkable moisture-curable organosilicon composition prepared by admixing components comprising:

(A) 100 parts by weight of at least one organosilicon compound (2) of the formula (III)

$$Y_{3-c}R^1_cSiO-[R^1_2SiO]_d-SiR^1_cY_{3-c} \qquad (III)$$

where
c is 0, 1, or 2,
R¹ may be identical or different and is as defined for R,
Y may be identical or different and is a hydroxy group or a hydrolyzable radical, and
d is a whole number from 200 to 10,000, and optionally one or more organopolysiloxanes different from (III) having at least two hydroxyl groups or at least two hydrolyzable radicals, (B) from 0.1 to 15 parts by weight, based on the total weight of the composition, of at least one organosilicon compound (1) of the formula (I)

$$(HO)_aR_bSiO_{(4-a-b)/2} \qquad (I),$$

where
R each is identical or different and is a monovalent, optionally substituted hydrocarbon radical optionally interrupted by heteroatoms,
a is 0 or 1, and
b is 0, 1, 2 or 3,
with the proviso that the organosilicon compound has one and only one unit of the formula (I) where a=1, and has a viscosity of from 5 to 1000 mPas at 25° C., (C) one or more silane crosslinking agents (3) or a partial hydrolysis product thereof, said silane crosslinking agents selected from the group consisting of tetraethoxysilane, tetraisopropoxysilane, tetra-n-propoxysilane, methyltrimethoxysilane, methyltriethoxysilane, vinyltrimethoxysilane, vinyltriethoxysilane, acetoxysilanes, and oximinosilanes, (D) optionally one or more condensation catalysts, (E) one or more plasticizers in an amount of from 10 to 300 parts by weight based on 100 parts by weight of organosilicon compound (2), (F) optionally, one or more fillers in an amount of 0 to 300 parts by weight based on the weight of (A), (G) optionally, one or more adhesion promoters, and (H) optionally one or more further additives selected from the group consisting of pigments, dyes, odorants, oxidation inhibitors, agents for influencing electrical properties, flame retardants, light stabilizers, skinning time lengthening agents, cell forming agents, heat stabilizers, thixotropic agents, and organic solvents.

2. The crosslinkable composition of claim 1, wherein the organosilicon compounds of units of the formula (I) are substantially linear diorganosiloxanes of the formula $$OH(R_2SiO)_nSiR_3 \qquad (II),$$

where R is as defined above, and the average value for n is such that the compound of formula (II) has a viscosity of from 5 to 500 mPas, measured at 25° C.

3. The crosslinkable composition of claim 1, wherein the organosilicon compounds of units of the formula (I) have a viscosity of from 20 to 200 mm²/s at 25° C.

4. The crosslinkable composition of claim 1, which comprises from 0.1 to 10 parts by weight, based on 100 parts by weight of crosslinkable composition, of organosilicon compounds of units of the formula (I).

5. The crosslinkable composition of claim 1, wherein organopolysiloxane (2) includes
(A) at least one organosilicon compound of the formula (III), $$Y_{3-c}R^1_cSiO-[R^1_2SiO]_d-SiR^1_cY_{3-c} \qquad (III)$$

where
c is 0, 1, or 2,
R¹ may be identical or different and is as defined for R,
Y are hydroxy or acetoxy radicals, and
d is a whole number from 400 to 2,000.

6. The composition of claim 1, wherein said compound of the formula (I) is an α-hydroxy-ω-trimethylsilylpolydimethylsiloxane.

7. The crosslinkable organosilicon composition of claim 1, wherein said crosslinking agent (3) is selected from the group consisting of alkoxysilanes, oximinosilanes, acetoxysilanes, mixtures thereof, and partial hydrolysates thereof.

8. The crosslinkable organosilicon composition of claim 1, wherein at least one adhesion promoter is present, and is a silane or organopolysiloxane bearing at least one functional group selected from the group consisting of glycidoxypropyl, aminopropyl, and methacryloxypropyl groups.

9. The crosslinkable organosilicon composition of claim 1, which contains a filler.

10. The crosslinkable composition of claim 1, wherein the filler is present in an amount of 1 to 200 parts by weight of filler based on 100 parts by weight of organopolysiloxane (2).

11. The crosslinkable organosilicon composition of claim 1, wherein component (B) is present in an amount of between 0.1 to 5 parts by weight per 100 parts by weight of the composition.

12. The composition of claim 1, which contains no filler.

13. The composition of claim 1, wherein the filler is present and is selected from the group consisting of silica, calcium carbonate, and mixtures thereof.

14. The composition of claim 1, wherein a hydrophilic fumed silica is present as a filler.

15. The composition of claim 1, wherein each R is individually selected from the group consisting of alkyl radicals, cycloalkyl radicals, aryl radicals, alkaryl radicals, and aralkyl radicals, each of these radicals optionally substituted by halogen, amino, ester, epoxy, mercapto, cyano, or polyglycol radicals.

16. The composition of claim 1, wherein each R is individually selected from the group consisting of unsubstituted alkyl radicals and unsubstituted aryl radicals.

17. The composition of claim 1, wherein R is a methyl radical.

18. The composition of claim 1, wherein each R is individually selected from the group consisting of alkyl radicals, cycloalkyl radicals, and alkenyl radicals, these radicals optionally substituted with one or more substituent groups selected from the group consisting of halogen, amino, ether, ester, epoxy, mercapto, cyano, and (poly)glycol.

19. The composition of claim 1, wherein the crosslinking agents (3) consist of one or more crosslinkers selected from the group consisting of methyltriacetoxysilane, ethyltriacetoxysilane, propyltriacetoxysilane, vinyltriacetoxysilane, and partial hydrolysates thereof.

20. The composition of claim 1 wherein the partial hydrolysates have 6 silicon atoms or less.

21. A molding produced by crosslinking the composition of claim 1.

22. The composition of claim 1, wherein the plasticizer is present in an amount of 10 to 100 parts by weight relative to 100 parts of organosilicon compound (2).

23. The composition of claim 1, wherein Y are acetoxy or hydroxy radicals and the crosslinker consists of an acetoxysilane or partial hydrolysate thereof.

24. A single component RTV-1 crosslinkable moisture-curable organosilicon composition prepared by admixing components comprising:

(A) at least one organosilicon compound (2) of the formula (III)

$$Y_{3-c}R^1{}_cSiO-[R^1{}_2SiO]_d-SiR^1{}_cY_{3-c} \quad (III)$$

where
c is 0, 1, or 2,
$R^1$ may be identical or different and is as defined for R,
Y may be identical or different and is a hydroxy group or a hydrolyzable radical, and
d is a whole number from 200 to 10,000, and optionally one or more organopolysiloxanes different from (III) having at least two hydroxyl groups or at least two hydrolyzable radicals, (B) at least one organosilicon compound (1) of the formula (I)

$$(HO)_aR_bSiO_{(4-a-b)/2} \quad (I),$$

where
R each is identical or different and is a monovalent, optionally substituted hydrocarbon radical optionally interrupted by heteroatoms,
a is 0 or 1, and
b is 0, 1, 2 or 3,
with the proviso that the organosilicon compound has one and only one unit of the formula (I) where a=1, and has a viscosity of from 5 to 1000 mPas at 25° C., (C) one or more crosslinking agents selected from the group consisting of methyltriacetoxysilane, ethyltriacetoxysilane, propyltriacetoxysilane, vinyltriacetoxysilane, tetraethoxysilane, tetraisopropoxysilane, tetra-n-propoxysilane, methyltrimethoxysilane, methyltriethoxysilane, vinyltrimethoxysilane, vinyltriethoxysilane, and partial hydrolysis products thereof, (D) optionally one or more condensation catalysts, (E) one or more plasticizers, (F) optionally, one or more fillers in an amount of 0 to 300 parts by weight based on the weight of (A), (G) optionally, one or more adhesion promoters, and (H) optionally one or more further additives selected from the group consisting of pigments, dyes, odorants, oxidation inhibitors, agents for influencing electrical properties, flame retardants, light stabilizers, skinning time lengthening agents, cell forming agents, heat stabilizers, thixotropic agents, and organic solvents.

* * * * *